Patented Nov. 28, 1950

2,531,688

UNITED STATES PATENT OFFICE 2,531,688

PREPARATION OF ESTERS OF 7-HALOGENO-CHOLESTEROL

Ewart Ray Herbert Jones, Austin Ernest Bide, and Ralph John Nicholls, London, England, assignors to Glaxo Laboratories Limited, Greenford, Middlesex, England, a British company No Drawing. Application February 17, 1947, Serial No. 729,192. In Great Britain February 25, 1946

6 Claims. (Cl. 260—397.2)

This invention is concerned with improvements in and relating to the preparation of derivatives of cholesterol, which substance may be represented by the formula

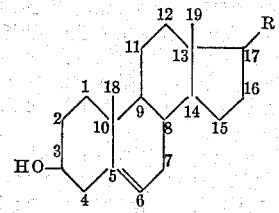

where R is a saturated open-chain hydrocarbon residue.

It is known that the 7-dehydro-derivative of cholesterol which has an additional double bond in the 7—8 position, is a provitamin and on irradiation with ultraviolet light leads to vitamin $D_3$.

British Patent 574,432 describes a process for the preparation of 7-dehydro-derivatives of certain sterols including cholesterol, in which a 3-ester of the sterol is reacted with a suitable N-halogenated acid amide or imide, preferably N-brommosuccinimide and the resulting halogenated product is dehydrohalogenated with a suitable organic base, preferably diethyl-or dimethyl-aniline.

The object of the present invention is to provide a new and convenient method for preparing steriod substances which are rich in 7-halogenocholesteryl esters, the term "halogeno" being used herein to denote chloro-or brom-derivatives. It is also an object of the present invention to provide a process for producing such substances in a form suitable for conversion, by dehydrohalogenation, into 7-dehydroderivatives of cholesteryl esters, for example, by the method described in the said British specification, and it should be noted that the isolation of the pure 7-halogenocholesteryl esters from the reaction product forms no part of the present invention although it can in some cases be accomplished by normal methods.

In general the products obtained by the present process will be used for conversion to the corresponding 7-dehydrocholesteryl esters from which 7-dehydrocholesterol may be obtained by hydrolysis. It should further be noted that the 7-halogenocholesteryl esters themselves cannot conveniently be hydrolysed as such without losing their halogen.

The method according to the present invention is based on the use, as halogenating agents, of compounds of the general formula.

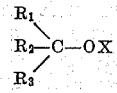

where X is chlorine or bromine, the former being preferred and $R_1$, $R_2$ and $R_3$ are lower alkyl groups such as methyl, ethyl or propyl. We prefer to use compounds in which the group

is tertiary butyl or tertiary amyl. Compounds of the above general formula will hereinafter be referred to as "halogenators."

According to the invention therefore we provide a process for the preparation of steroid substances which are rich in 7-halogenocholesteryl esters in which a suitable 3-ester of cholesterol as herein defined is reacted with a halogenator as herein defined.

We prefer to carry out the reaction with a solution of the cholesteryl ester in a solvent as herein defined and it is also preferable that the reaction should take place in the presence of an organic peroxide such for example as benzoyl peroxide or acetyl peroxide.

The term "suitable ester" as used herein means an ester of a carboxylic acid, excluding any ester, the acyloxy fragment of which contains any grouping which reacts either with the halogenator or with the halogenated cholesterol, it being understood that the term acyloxy is used in its broad sense and does not merely imply derivatives of aliphatic acids. It may be stated that we prefer to use cholesteryl acetate.

As solvent for the cholesteryl ester we prefer to use carbon tetrachloride, but we may use any solvent for the ester which is inert or substantially inert to the halogenator to be used. It may here be noted that some solvents such as aliphatic hydrocarbons or mixtures thereof and ethers react readily with halogenators of the above stated general formula, and are therefore not suitable for use.

We prefer to use equimolecular proportions of the cholesteryl ester and halogenator and to carry out the halogenating reaction at the boiling point of the solvent, but lower temperatures may be employed, in which cases it will be desirable to keep the reaction mixture agitated.

The reaction is preferably continued until the mixture contains no active halogen, by which we mean no halogen which will cause the appearance of iodine when the mixture is shaken with an aqueous solution of potassium iodide.

When the halogenation reaction has been completed we may remove the solvent, preferably under reduced pressure when there will be left a mixture of halogenated steriods containing a substantial proportion of 7-halogenocholesteryl ester.

This product will be found to be suitable for dehydrohalogenation in the manner described in the said prior specification, so as to obtain the 7-dehydrocholesteryl ester, which can of course be hydrolysed to form 7-dehydrocholesterol.

Where it is intended to dehydrohalogenate the above mentioned mixture, we may add the tertiary organic base used for this purpose to the solution obtained as a result of the halogenation reaction before removing the solvent and then complete the process as described in the said prior specification.

The following examples, which are given only as illustrations, describe several methods by which the invention may be carried into effect and for the better understanding of the invention the examples also describe the conversion of the products obtained into 7-dehydrocholesterol and the yields thereof obtained.

*Examples*

(1) Twenty-eight g. of cholesteryl acetate are dissolved in 125 ml. of carbon tetrachloride, followed by 0.1 g. of benzoyl peroxide. 7.1 g. of freshly prepared tert-butyl hypochlorite are now added, and the reaction mixture heated on the steam bath under reflux, until the addition of one drop of the reaction mixture to an aqueous solution of potassium iodide results in no immediate liberation of iodine. This usually takes 15-25 minutes.

The solvent is now removed from the reaction mixture by heating in vacuo, and the residue of halogenated steroids is dissolved in ten times its weight of diethylaniline.

Dehydrohalogenation is effected by heating the diethylaniline solution rapidly to the boiling point, maintaining there for 10 mins., and then pouring the hot solution onto 500 g. of crushed ice. The mixture is extracted with 750 ml. of petroleum ether (B. P. 60°-80°), and then the aqueous solution re-extracted with 500 ml. of the same solvent. The united extracts are washed with 2 separate quantities of 500 ml. of 10% w./v. hydrochloric acid, and then once with 250 ml. of 5% aqueous sodium carbonate solution.

The petroleum ether is then removed by distillation in vacuo, and to the residue of sterol acetates are added 90 mls. of a 5% ethyl alcoholic solution of caustic potash. Saponification is carried out by refluxing the mixture on the steam bath for 20 mins. At the end of this time any separated inorganic salts are removed by hot filtration, and the filtrate is allowed to stand in the refrigerator over-night.

The precipitated crystals are collected, washed with 75 ml. of 90% ethyl alcohol, and then with undiluted ethyl alcohol until substantially free from colour.

There are obtained in this way 15-20 g. of material containing 15-20% of the desired 7-dehydrocholesterol.

(2) Twenty-eight g. of cholesteryl acetate are dissolved in 125 ml. of carbon tetrachloride and 10 g. of tert-butyl hypobromite are added. The mixture is heated at the boiling point until there is no longer present any active halogen, which generally takes about 5 minutes.

The solvent is removed in vacuo with the application of gentle heat, and 46 ml. of diethylaniline are added to the residue. The resulting solution is heated for 3 hrs. on the steam bath with gentle stirring. At the end of this time, the mixture is cooled and 150 ml. of petroleum ether (B. P. 60/80° C.) are added. The precipitated diethylaniline hydrobromide is filtered off, and the excess diethylaniline in the petrol solution removed by washing with acid.

The resulting solution of sterol acetates is then saponified with alcoholic potash and further treated as described in Example (1) to yield a product containing about 16% of the desired 7-dehydrocholesterol.

(3) Twenty-eight g. of cholesteryl acetate and 0.1 g. of benzoyl peroxide dissolved in 100 ml. of carbon tetrachloride are treated at the boiling point with a solution of 8 g. of tert-amyl hypochlorite in 50 ml. of carbon tetrachloride added over a period of 2 hours.

At the end of this time there is no longer present in the solution any available halogen, and the mixture is further treated as described in Example (1) to obtain the desired 7-dehydrocholesterol in approximately 6% yield.

We claim:

1. A process for the preparation of 7-halogenocholesteryl esters of carboxylic acids which comprises reacting a mixture of carboxylic acid ester of cholesterol in carbon tetrachloride with a halogenating compound of the general formula

where $R^1$, $R^2$ and $R^3$ are alkyl groups having not more than three carbon atoms and X is selected from the group consisting of chlorine and bromine.

2. The process defined in claim 1 in which the reaction is carried out in the presence of an organic peroxide.

3. A process for the preparation of 7-halogeno derivatives of cholesteryl acetate in which a mixture of cholesteryl acetate in carbon tetrachloride is reacted with a compound of the general formula

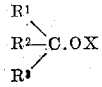

where $R^1$, $R^2$ and $R^3$ are alkyl groups having not more than three carbon atoms and X is selected from the group consisting of chlorine and bromine.

4. The process defined in claim 1 in which the halogenating compound is tertiary amyl hypochlorite.

5. A process for the preparation of 7-halogenocholesteryl esters of carboxylic acids which comprises reacting in carbon tetrachloride approximately equimolecular proportions of a carboxylic acid ester of cholesterol and a halogenating compound of the general formula

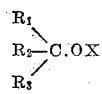

where $R^1$, $R^2$ and $R^3$ are alkyl groups having not more than three carbon atoms and X is selected from the group consisting of chlorine and bromine, the reaction being carried out at the boiling point of the reaction mixture.

6. A process for the preparation of carboxylic acid esters of 7-chlorocholesterol comprising reacting a carboxylic acid ester of cholesterol dissolved in carbon tetrachloride with tertiary butyl hypochlorite.

EWART RAY HERBERT JONES.
AUSTIN ERNEST BIDE.
RALPH JOHN NICHOLLS.

REFERENCES CITED

The following references are of record in the file of this patent:

UNITED STATES PATENTS

| Number | Name | Date |
|---|---|---|
| 2,403,683 | Reichstein | July 9, 1946 |
| 2,441,091 | Vliet | May 4, 1948 |

FOREIGN PATENTS

| Number | Country | Date |
|---|---|---|
| 574,432 | Great Britain | Jan. 4, 1946 |

OTHER REFERENCES

Cohn, "Arbeits Methoden fur Organisch—Chemische Laboratorien, Speziellen Teil," 5th Ed., 1923, page 252.

McBee, Chem. Trade Jour. and Chem. Eng., April 4, 1941, page 199.

Ziegler, Annalen 551, pages 93–104 (1942).